Aug. 19, 1952     R. E. MOORE     2,607,535
HOT WATER HEATING SYSTEM

Filed May 12, 1951     3 Sheets-Sheet 1

Inventor.
Robert E. Moore.
By John M Warley
Attorney.

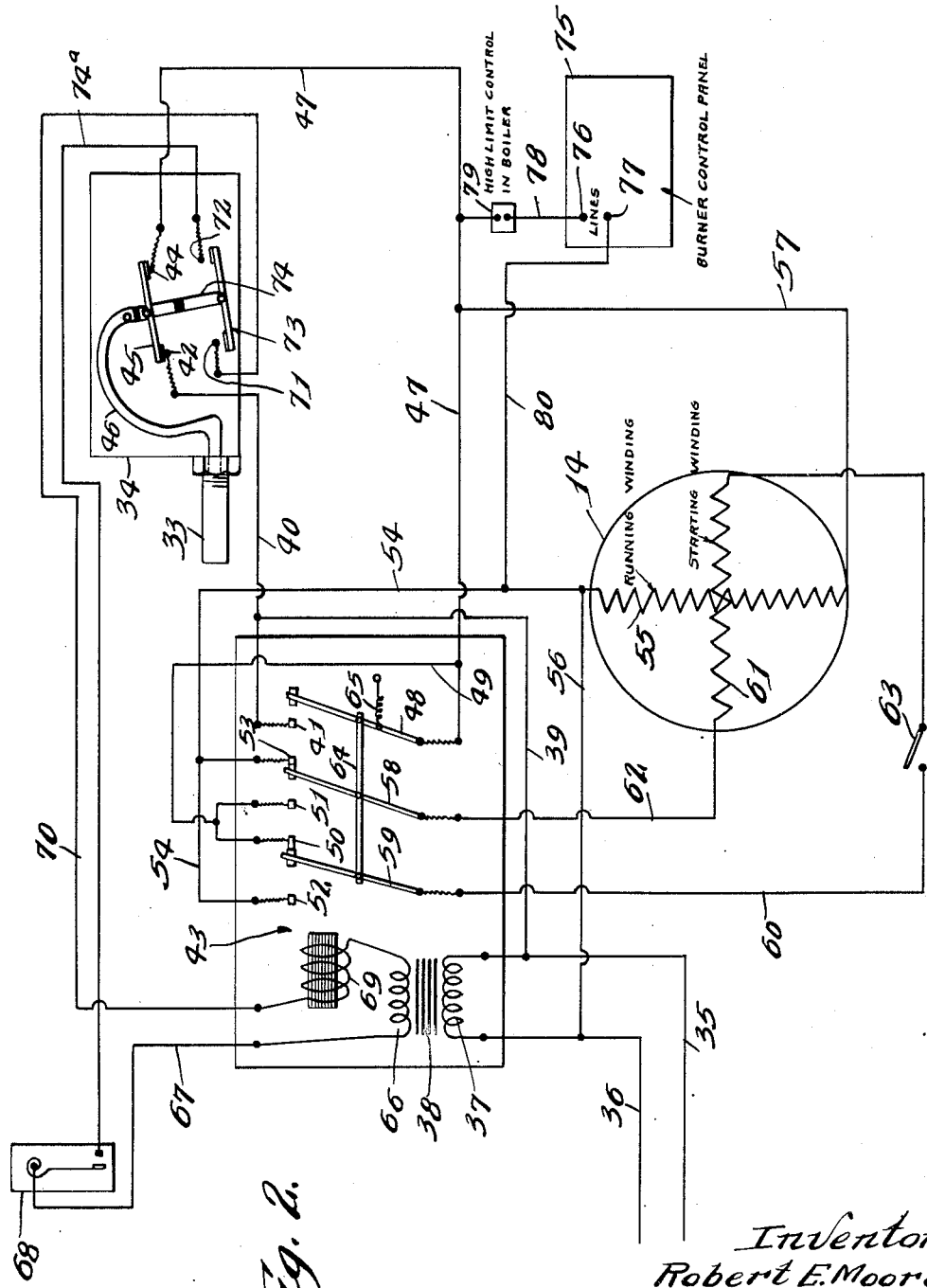

Aug. 19, 1952  R. E. MOORE  2,607,535
HOT WATER HEATING SYSTEM
Filed May 12, 1951  3 Sheets-Sheet 3
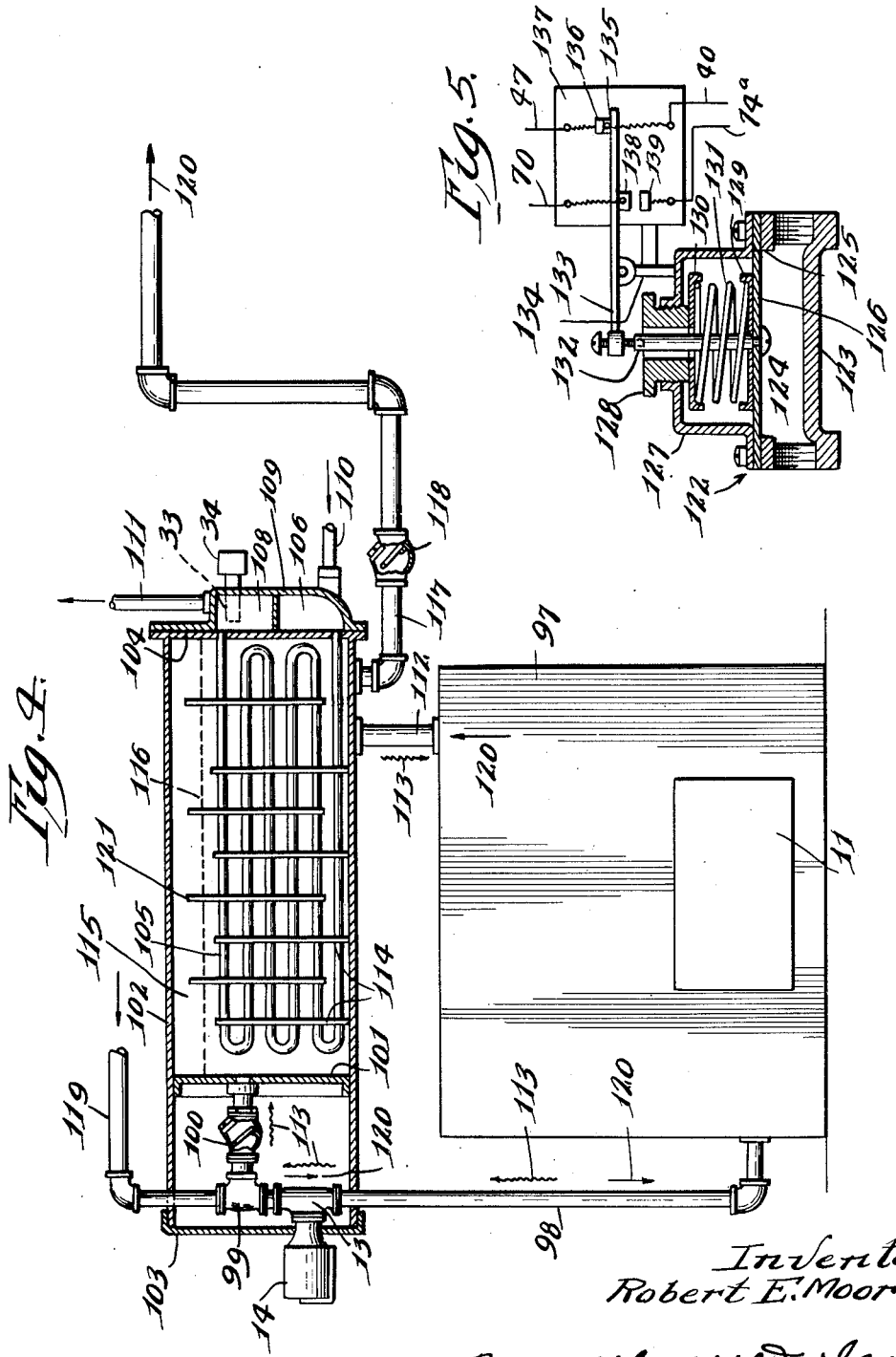
Inventor:
Robert E. Moore.
By. John M. Darley
Attorney.

Patented Aug. 19, 1952

2,607,535

UNITED STATES PATENT OFFICE 2,607,535

HOT-WATER HEATING SYSTEM

Robert E. Moore, Winnetka, Ill.

Application May 12, 1951, Serial No. 226,068

12 Claims. (Cl. 237—8)

My invention relates to hot water heating systems and more particularly to an arrangement for supplying hot water to the radiators and hot water for service or domestic use in quantities limited only by boiler capacity and in which the boiler is only required to satisfy either of these demands at any one time.

In hot water heating systems which are intermittently and automatically fired by gas or oil, a characteristic hook-up includes a main circuit leading to the radiators or space heaters generally having one or more flow control valves operated by a circulating pump which is responsive to the demands of a room thermostat and a parallel service water heating circuit through which boiler water flows continuously, the latter flow being thermogravitational and therefore at a slow rate when the pump is not operating. It has been recognized that while a system of this type possesses simplicity of arrangement which is reflected in certain installation advantages, it is objectionable in other respects, namely, a heating efficiency that is lower than it should be and longer "on" periods of the pump and burner under conditions of sustained demand by either the room thermostat or for service water or both.

For example, if after a sustained draw of service water with a consequent reduction in the temperature of the boiler water, the room thermostat should demand heat, there will obviously be a considerable lag in supplying heat to the space heating elements since the boiler it at the same time trying to restore the temperature of the service water. This condition is due to the relatively low initial temperature of the boiler water at the instant of demand and also because the cold water from the space heating elements is continuously circulated through the boiler and over or through the heating coil in the service water heating circuit so that the temperature of the boiler water rises slowly. On the other hand, if the demand for service water follows a heavy space heating demand, the supply of hot spigot water will be inadequate and where both demands are made simultaneously, neither the space heating nor the service heating requirements are met satisfactorily. Moreover, due to the slow movement of the boiler water across the service water heating coil, or through this coil as the case may be, during inactive periods of the pump, the exchange of heat is relatively inefficient. Further, difficulties arise in installations of the foregoing character due to lack of control over the temperature of the service water. In certain localities where the service water is indirectly heated by the boiler water to a temperature in excess of 140° F., deposits of lime and sediment are formed rapidly in the tank or the coils of the heater, thus reducing the rate of heat exchange and lowering the temperature of the water available at the service outlets. This liming condition is continuously aggravated by recurrent periods of overheating. Problems of the foregoing nature are frequently encountered in apartment, restaurant, garage and hotel heating systems with their particularly heavy and all year round demands for service water, but they are not uncommon in domestic installations.

If initial costs are not a factor, a partial solution of the foregoing is possible if boilers larger than the ordinary oversize boilers are used with corresponding sizes of heating coils or hot water storage tanks. Such costs, however, must usually be considered. The initial investment required with such a system is not only prohibitive but the fuel costs and heat losses are excessive and there is an extremely wasteful standby heat loss when there are no demands for space heating and for service water. The latter condition is especially true with boilers built for gas firing since such boilers are designed with large heating surfaces and relatively small water capacity. Accordingly, such boilers cool rapidly when the burner stops due to the sweep of cold air across the heating surfaces in its passage to the chimney and the temperature of the service water likewise falls.

It is therefore the principal object of my invention to devise a heating system which utilizes a boiler, economical in size and fuel consumption, that is so related to the remainder of the system that copious quantities of hot service water are immediately available within a shorter time than is possible with existing equipment and in which hot water for the space heating elements is furnished more quickly.

A further object is to devise a system which is characterized by a high heating efficiency, both space and service water heating, because the water whose temperature provides the fundamental control is heated by boiler water which has a short circulatory path to and from the boiler so that it may be quickly brought to the desired operating temperature.

A further object is to provide a system in which water from the boiler is forced through the space heating elements in response to the demand of the room thermostat for heat only when the temperature of the service water is at a predetermined maximum, thus insuring an adequate supply of hot service water and also quickly raising the temperature of the water for the space heating elements when circulation is established, as well as preventing the return of cold water from the space heating elements to the boiler at times when the temperature of the service water is below the maximum which would otherwise delay the required rise in temperature of the water in the boiler.

A further object is to devise a system having radiator or space heating and service water heating portions, passage of water to the space heating elements being controlled by the demand of a room thermostat for heat and effective only when the temperature of the service water is at a predetermined maximum.

A further object is to devise a system of the foregoing character in which a reversible pump forces water through the space heating elements or through the service water heater thus increasing the circulatory rate through the heater and facilitating the exchange of heat.

A further object is to provide a heating system of the character indicated in which the flow of water to the space heating elements is at all times subordinate to the service water being raised to a predetermined temperature.

A further object is to devise a hot water heating system incorporating a tankless or instantaneous heater for service water in which the flow of water across the heater coil and to the space heating elements never occurs simultaneously whereby the full heating capacity of the boiler is applied to either duty.

These and further objects of the invention will be set forth in the following specification, reference being had to the accompanying drawings, and the novel means by which said objects are effectuated will be definitely pointed out in the claims.

In the drawings:

Fig. 2 is a schematic view showing a typical, electrical circuit for controlling the operation of any of the system modifications.

Figs. 3 and 4 are elevations, partly in section, showing variant arrangements of the system.

Fig. 5 is a sectional elevation of a pressure operated control which may be utilized in place of the temperature responsive control shown in Fig. 2.

Figure 1:
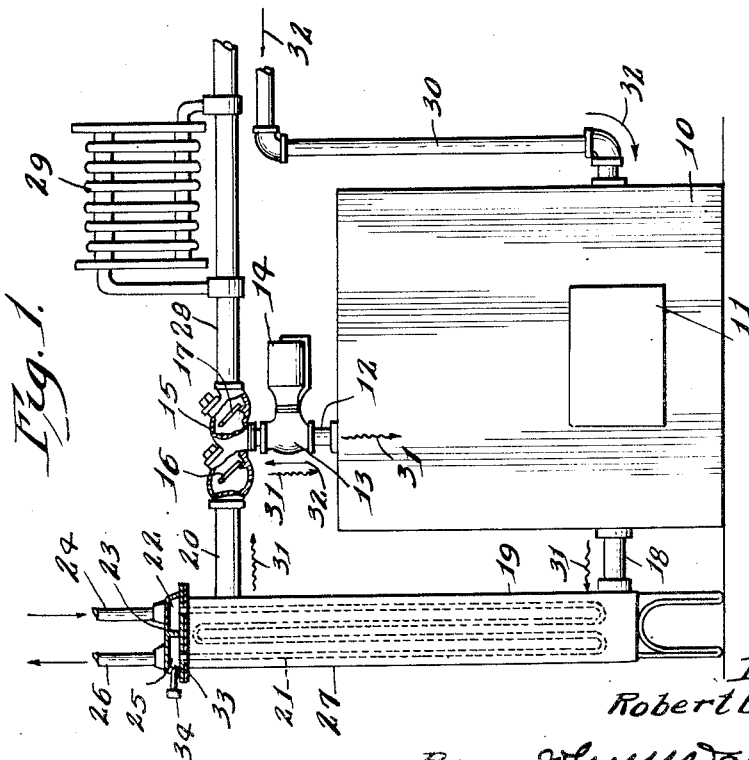
Fig. 1 is an elevation, partly in section, of one exemplification of the heating system, the electrical controlling circuit being omitted.

Referring to Fig. 1, the numeral 10 designates a hot water boiler which is fired by any type of automatically fired heating unit or burner utilizing gas, oil or coal and generally designated by the numeral 11. Extending from the top of the boiler is a riser 12 which connects with one side of a circulating pump 13 of the reversible type which is driven by a reversible motor 14. In a simple form of such a pump, the impeller thereof may be straight bladed so that it is able to pump with equal facility in either direction.

The other side of the pump 13 connects with the central part of a valve body 15 which is interiorally provided on opposite sides of the connection of the body to the pump with pivoted, flow control valves 16 and 17, respectively, that are gravity actuated to the closed positions shown in Fig. 1 and one of which opens in response to pump pressure depending upon the direction of operation of the pump. A pipe 18 connects the lower part of the boiler 10 with the lower part of a vertical casing 19 whose upper end connects through a pipe 20 with one end of the valve body on the inlet side of the valve 16. Positioned within the casing 19 is a service water heating coil 21 whose inlet connects through a chamber 22 in a header 23 with a cold water supply pipe 24. The other end of the coil 21 connects through a chamber 25, also in the header 23, with a pipe 26 leading to service outlets.

The casing 19 and coil 21 comprise a so-called tankless or instantaneous heater, generally indicated by the numeral 27, in which the coil 21 possesses sufficient heating surface to insure that cold water entering the coil will have its temperature raised an adequate amount by the time that it reaches the chamber 25. The parts set forth above, excepting the valve 17, comprise the service water heating circuit and of these parts, the boiler 10, pump 13 and motor 14 are also common to the radiator or space heating circuit that will now be described.

One end of a supply pipe 28 connects with the opposite end of the valve body 15 on the outlet side of the valve 17. The remainder of the pipe 28 connects in the usual way with any number of radiators, generally indicated by the numeral 29, and the return from the radiators to the bottom of the boiler is effected through a pipe 30. The term "radiators" is intended to generically include any form of space heating element, such as the commonly designated radiator, convector and heating coils which are embedded in floors, ceilings and walls, i. e., the so-called panel heating units.

From the foregoing, it will be understood that when the pump 13 is running in a direction to force water downwardly through the boiler 10 in a direction indicated by the wavy shafted arrows 31, the flow is thence upwardly through the casing 19 in heat exchange relation to the coil 21, through the pipe 20, past the valve 16 which is opened by pump pressure, and to the upper end of the pump, thus completing the service water heating circuit. During this flow, pump pressure acts with equal force against opposite sides of the valve 17 so that this valve is closed by gravity and flow to the space heating circuit is prevented. When the pump 13 is operating in the opposite direction, the flow direction is indicated by the straight shafted arrows 32, i. e., upwardly through the boiler 10, past the valve 17 which is opened by pump pressure, through the pipe 28 to the space heating element 29, and back to the boiler through the pipe 30. The valve 16 is then closed by its weight since equal pump pressure acts against opposite sides thereof and flow through the service water heating circuit is denied.

The invention contemplates that water can be pumped through the space heating circuit only when the service water is at or slightly exceeds a predetermined temperature, preferably not less than 140° F., subject to the further demand of a room thermostat, and whenever the temperature of the service water falls below this minimum, flow to the space heating circuit, if then occurring, will be interrupted until the temperature of the service water is again raised to 140° F., notwithstanding that the room thermostat may be demanding heat during the supply of heat to the service circuit. To effect this preference for the service circuit, a liquid filled bulb 33 is immersed in the chamber 25, i. e., adjacent the outlet of the heating coil 21, and this bulb forms part of a temperature responsive control generally indicated by the numeral 34 and whose detailed structure will be presently described. As an alternative, the bulb 33 may be mounted within the casing 19 for immersion in the boiler water circulating therethrough. Since the temperature of the boiler water in the casing 19 always bears a factorial relation to the desired maximum temperature of the service water, the control 34 may be calibrated accordingly and considered as being indirectly responsive to the temperature of the service water.

The several control devices and the allied electrical circuit whereby selection of flow through the space and service circuits is automatically determined is schematically illustrated in Fig. 2 wherein the parts are shown in positions giving preference to the supply of heat to the service circuit.

Referring to Fig. 2, the numerals 35 and 36 designate power wires, the former being regarded as the hot wire, which are respectively connected to the ends of the primary winding 37 of a step down transformer 38. A wire 39 connects with the hot wire 35 and a wire 40 which in turn connects with contacts 41 and 42, the contact 41 forming part of a three pole relay generally indicated by the numeral 43 with two of the poles being double throw in switching action and the other pole including the contact 41 being single throw, while the contact 42 forms part of the control 34 which is responsive to the temperature of the service water.

Cooperably related to the contact 42 is a contact 44 and these contacts are bridged by a switch arm 45 whenever the service circuit demands heat, the arm 45 being carried by and insulated from the free end of a Bourdon tube 46 whose fast opposite end communicates with the bulb 33. The bulb 33 and tube 46 are filled with any of the fluids commonly used with such devices so that, as the temperature of the service water rises to the desired maximum, the straightening movement of the tube 46 raises the arm 45 and breaks the associated circuit across the contacts 42 and 44, the arm 45 being shown in circuit closing position.

The contact 44 connects by a wire 47 with the pivoted end of a single throw, switch arm 48, forming part of the relay 43, and the opposite end of the arm 48 engages the contact 41 when heat is supplied to the space circuit as presently described. Also connected to the wire 47 is one end of a wire 49 whose opposite end terminates in a pair of branches respectively connected to switch contacts 50 and 51.

Adjacent the contacts 50 and 51 are the contacts 52 and 53, respectively, which are connected to a wire 54 that in turn connects with one end of the running winding 55 of the reversible motor 14 and also through a wire 56 with the power wire 36. The other end of the running winding 55 connects by a wire 57 with the wire 47.

The free ends of pivoted switch arms 58 and 59 are movable between contacts 51 and 53 and contacts 50 and 52, respectively, and the pivoted end of the switch arm 59 connects through a wire 60 with one end of the starting winding 61 of the motor 14 while the opposite end of this winding connects by wire 62 with the pivoted end of switch arm 58. A starting switch 63, preferably built in as a part of the motor 14, is included in the starting winding circuit between the switch arms 58 and 59. For purpose of subsequent explanation, the switch 63 is shown in open position, but when the heating system is placed in operation, this switch is closed and remains closed, all regulation of the system being automatically determined by other parts thereafter.

The switch arms 48, 58 and 59 and the associated contacts 41, 51 and 53, and 50 and 52, respectively, are included in the relay 43, the arms being connected for simultaneous movement by a link 64 and biased to the positions shown in Fig. 2 by a spring 65.

To shift the switch arms 48, 58 and 59 into engagement with the contacts 41, 51 and 52, respectively, for determining a supply of heat to the space circuit if the space is then demanding heat, the following instrumentalities are provided. One end of the secondary winding 66 of the transformer 38 connects by a wire 67 with one terminal of a typical room thermostat 68 which may be of the bimetal type, while the other end of the winding 66 connects with one end of a holding coil 69 which is located in coacting relation to the switch arm 59 so that, when the coil is energized as presently described, the switch arms 48, 58 and 59 will be simultaneously shifted to engage the contacts 41, 51 and 52, respectively, against the pull of the spring 65.

The other end of the holding coil 69 connects by a wire 70 with a contact 71 that is cooperably related to a contact 72, these contacts being bridgeable under determined conditions by a switch arm 73 that is supported by and insulated from the arm 45 by a spacer 74. The arrangement is such that when the arm 45 bridges the contacts 42 and 44 by reason of the contraction of the Bourdon tube 46, the arm 73 is shifted out of engagement with the contacts 71 and 72, but when the tube 46 straightens sufficiently, which effects a slight raising of the free end of the tube, the arm 45 breaks engagement with the contacts 42 and 44 and the arm 73 engages the contacts 71 and 72. The contact 72 connects to the other terminal of the room thermostat 68 by a wire 74a.

From the foregoing, it will be understood that the control 34, which is responsive to the temperature of the service water, comprises the bulb 33, Bourdon tube 46, switch arm 45, contacts 42 and 44, switch arm 73 and contacts 71 and 72. The last named arm and contacts, while forming a part of the electrical circuit which includes the room thermostat 68, are considered to be embodied in the control 34 because the position of the switch arm 73 is determined by the Bourdon tube 46.

Power is supplied to the burner 11 through a burner control panel 75 having line contacts 76 and 77, the former being connected through a wire 78 and a high limit or safety control 79 with the wire 47, while the contact 77 connects through the wire 80 with the wire 54. The contacts 76 and 77 are connected further and in the conventional manner with the proper elements of the burner 11, but since these connections do not form any part of the invention, they are neither illustrated nor described. The high limit control 79 is mounted in the boiler 10 in the usual manner so as to be responsive to the temperature of the boiler water and is normally closed.

With the parts in the several positions shown in Fig. 2, power is supplied to the panel 75 from the power wire 35 through the hot wire 39, wire 40, contact 42, switch arm 45, contact 44, wire 47, control 79, wire 78 to the line contact 76, and the burner circuit from the panel is completed through the contact 77 and wires 80, 54 and 56 to the power wire 36. When the control 34 is conditioned to open the switch arm 45 and to close the switch arm 73, which additionally moves the relay switch arm 48 into engagement with the contact 41, power is supplied to the panel 75 from the power wire 35 through the hot wire 39, wire 40, contact 41, switch arm 48, wire 47, high limit switch 79 and wire 78 to the line contact 76, and the burner circuit from the panel is completed through the contact 77 and wires 80, 54 and 56 to the power wire 36.

The purpose of the high limit control 79 is to prevent an excessive temperature of the boiler water. By way of example, it will be considered that the control 79 is adjusted to open when the boiler water attains a temperature of 180° F. At all temperatures below this temperature, the control 79 is closed and operation of the burner 11 is determined by the control 34 and the room thermostat 68.

In describing the operation of the system, it will be assumed that the system is being placed in operation for the first time and is therefore cold. The parts then occupy the positions shown in Figs. 1 and 2. When the starting switch 63 is closed, it being understood that a suitable power connection has otherwise been made to the power wires 35 and 36, power is supplied to the burner 11 through the circuit which includes the contacts 42 and 44 and the switch arm 45 as described above so that the burner begins operation.

At the same time, power is supplied to the running and starting windings 55 and 61, respectively, of the motor 14 which drives the pump 13 to cause circulation through the service circuit in the direction of the arrows 31, the flow control valve 16 being opened by pump pressure and the flow control valve 17 remaining closed. Specifically, the circuit through the running winding 55 includes power wire 35, hot wire 39, wire 40, contact 42, switch arm 45, contact 44, wire 47, wire 57, running winding 55, and wires 56 and 36. The circuit through the starting winding 61 includes power wire 35, hot wire 39, wire 40, contact 42, switch arm 45, contact 44, wire 47, wire 49, contact 50, switch arm 59, wire 60, switch 63, starting winding 61, wire 62, switch arm 58, contact 53, and wires 54 and 56 to the power wire 36.

The foregoing condition continues until the temperature of the service water attains the assumed controlling temperature of 140° F., notwithstanding any demand of the room thermostat 68 for heat. Until the Bourdon tube 46 opens the switch arm 45 at the controlling temperature, the switch arm 73 remains open to break the circuit through the thermostat 68 even though the latter is closed.

When the service water temperature reaches 140° F., the Bourdon tube 46 opens the switch arm 45 and closes the switch arm 73. If the room thermostat 68 is not then demanding heat, the burner 11 and motor 14 ceases operation since the relay switch arm 48 is in the open position shown in Fig. 2. However, if the room thermostat 68 is closed when the switch arm 45 is opened, or if the former closes at any time thereafter while the switch arm 45 is open, the holding coil 69 is energized to thereby rock the relay switch arms 48, 58 and 59 into engagement with the contacts 41, 51 and 52, respectively. Due to the closing of the switch arm 48, the burner 11 is placed in operation if then shut down, or continues to operate if the room thermostat 68 had closed prior to the closing of the switch arm 73.

At the same time, the polarity across the starting winding 61 is reversed so that the motor 14 runs in the opposite direction and circulates boiler water through the space circuit in the direction of the arrows 32, the flow control valve 17 being opened by pump pressure and the flow control valve 16 being closed. The polarity reversal is effected by a circuit which, beginning with the power wire 35, includes the hot wire 39, wire 40, contact 41, switch arm 48, wires 47 and 49, contact 51, switch arm 58, wire 62, starting winding 61, wire 60, switch 63, switch arm 59, contact 52, wires 54 and 56, and power wire 36. The polarity across the running winding 55 remains unchanged since its circuit then includes the closed relay switch 48, wires 47 and 57, the winding itself, and the wire 56 to the power wire 36.

Heating of the space circuit continues as long as the room thermostat 68 remains closed, or until the service circuit demands heat. If the latter does not occur before the thermostat 68 is satisfied, then the opening of the thermostat 68 deenergizes the holding coil 69 so that the relay switch arms 48, 58 and 59 are retracted to the positions shown in Fig. 2, but the switch arm 73 remains closed since the temperature of the service water is then at or above the controlling temperature of 140° F. Under these conditions, the burner 11 and the motor 14 shut down because power is supplied thereto through either the switch arm 45 or the switch arm 48 and both of these arms are now open.

However, if before the space circuit is satisfied, the service circuit demands heat, the contraction of the Bourdon tube 46 closes the switch arm 45 and opens the switch arm 73, thereby deenergizing the holding coil 69, restoring the relay switch 48 to the position shown in Fig. 2, and reversing the rotation of the motor 14 so that circulation is established in the service circuit in the direction of the arrows 31 and denied to the space circuit, all as described in detail above.

Figure 3:
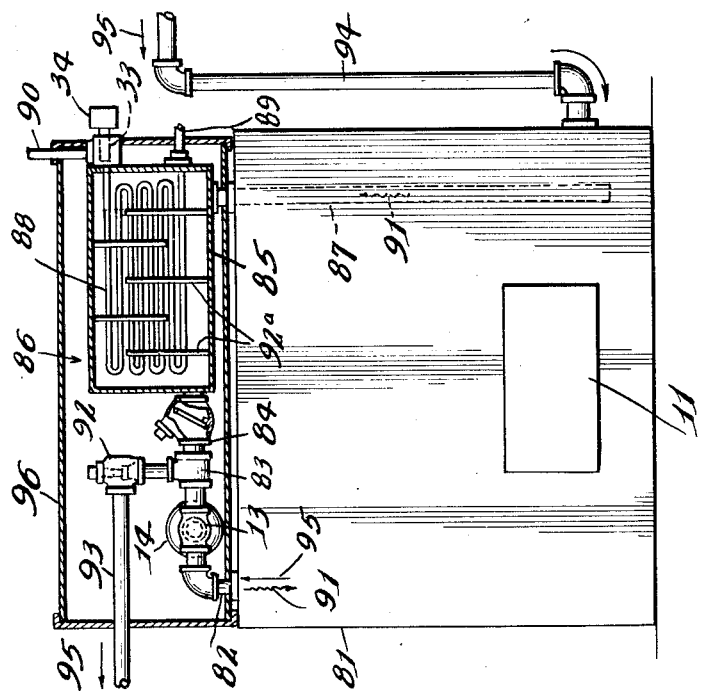

In Fig. 3 is illustrated a variation of the system in which the principal differences consists in a rearrangement of certain mechanical components, the separate water circuits being retained as well as the electrical control system shown in Fig. 2. Like parts in Figs. 1 and 3 are identified by the same numerals.

The numeral 81 designates a hot water boiler that is fired by the burner 11 and extending from the upper part of the boiler is a riser 82 that in turn connects with one side of th reversible pump 13 driven by the reversible motor 14. The other side of the pump 13 connects with one coaxial branch of a T 83 whose other coaxial branch connects with the outlet of a flow control valve 84 that is similar to the valves 16 and 17. The inlet of the valve 84 communicates with one end of a casing 85 forming part of an instantaneous heater generally indicated by the numeral 86 and, adjacent the opposite end of the casing 85, the bottom thereof communicates with the boiler 81 through a tube 87 which may extend close to the bottom of the boiler to improve circulation within the boiler. However, the tube 87 is not essential to the operation of the system. A service water heating coil 88 is mounted within the casing 85 in heat exchange relation to boiler water coursing therethrough and the inlet of this coil is connected to a cold water supply pipe 89 while its outlet communicates with a pipe 90 leading to the usual service outlets.

The parts just described constitute the service circuit and when the pump 13 is driven in the appropriate direction, the circulation is in the direction of the wavy shafted arrows 91, the flow control valve 84 being opened by pump pressure. Preferably, the interior of the casing 85 includes a plurality of baffles 92 which are located in the conventional manner to establish a sinuous path for the boiler water flowing through the casing to facilitate heat exchange with the coil 88. Adjacent the outlet of this coil, the bulb 33 is immersed in the service water and it, the burner 11 and the motor 14 are tied in with the electrical control circuit shown in Fig. 2.

The lateral branch of the T 83 connects with the inlet of a flow control valve 92 that is of the vertically reciprocable type, as distinguished from the pivoted type exemplified by the valve 84, and the outlet of the valve 92 connects through a pipe 93 with any desired number of space heating elements 29. Water from these elements is returned to the bottom of the boiler 81 through a pipe 94. The parts just described, together with the riser 82 and pump 13, form the space heating circuit and, when the pump 13 is driven in the proper direction, circulation through this circuit is indicated by the straight shafted arrows 95, the valve 92 being opened by pump pressure and the valve 84 being gravity closed since pump pressure then acts with equal force on opposite sides of this valve.

The operation of this system is identical with that shown in Fig. 1, flow through the space circuit being subordinate to flow through the service circuit and both never occurring at the same time. The principal advantage of this modification is that the parts disposed above the boiler 81, including the pump 13, motor 14, T 83, valves 84 and 92, instantaneous heater 86 with its control 34, are mounted within a casing 96 which additionally includes such fittings as will enable the parts to be connected to the boiler and the remainder of the system. Hence, it is possible to assemble the parts within the casing 96 at the factory and ship this unit for installation.

Since systems of the character illustrated in Figs. 1 and 3 are ordinarily of the closed type, it will be understood that the usual expansion tank and pressure relief valve would be associated with the respective boilers to accommodate pressure fluctuations and excessive pressures in the system, but since these parts are not necessary to an understanding of the inventive concept, they have not been illustrated or described in detail.

In Fig. 4, however, there is illustrated a further variation in which the instantaneous heater is additionally conditioned to serve as an expansion tank. Like parts which are identical with those shown in Figs. 1 and 3 are designated by like numerals.

The boiler 97 is fired by the burner 11 and from the bottom of the boiler extends upwardly a pipe 98 for connection with one side of the reversible pump 13 which is driven by the reversible motor 14. The other side of the pump connects with one coaxial branch of a T 99 whose lateral branch communicates with the inlet of a pivoted flow control valve 100 whose outlet connects through an intermediate wall 101 provided in a casing 102 having an end wall 103 sufficiently spaced from the wall 101 to include therebetween the pump 13, T 99 and valve 100. For a reason presently explained, the connection of the valve 100 to the intermediate wall 101 is disposed radially inward of and below the periphery of the wall 101 if the casing is cylindrical.

The other end of the casing 102 carries a tube sheet 104 in which are mounted the ends of a plurality of tube passes generally forming a service water heating coil 105 that extends into that part of the casing 102 included between the wall 101 and the tube sheet 104 and is in heat exchange relation to the boiler water in this part of the casing. The inlet and outlet ends of the coil 105 communicate, respectively, with inlet and outlet chambers 106 and 108 provided in a header 109 which abuts the tube sheet 104 and is suitably secured to the casing 102. A cold water pipe 110 connects with the inlet chamber 106 and a hot or service water pipe 111 connects the outlet chamber 108 with the service outlets. Adjacent the tube sheet 104, the lower portion of the casing 102 connects with the top of the boiler 97 through a pipe 112.

The parts just described constitute the service circuit and when the pump 13 is driven in the proper direction, circulation through this circuit is in the direction of the wavy shafted arrows 113, the valve 100 being opened by pump pressure. To facilitate heat exchange between the boiler water in the casing 102 and the coil 105, a plurality of baffles 114 are spaced along the coil to cause the boiler water to pursue a sinuous course in moving from the wall 101 to the pipe 112. The alternate, upper baffles 114 are spaced from the upper portion of the casing 102 by notching or otherwise so that when the system is filled, an air space 115 is formed above the water level, indicated by the numeral 116. The trapping of air in this space is occasioned by the position of the outlet connection from the valve 100 in the wall 101 which is located at a suitable distance below the upper part of the casing 102 for this purpose. This trapped air accommodates expansion in the system since the casing 102 communicates at all times with the boiler through the pipe 112.

The bulb 33 is immersed in the service water in the outlet chamber 108 and this bulb, the burner 11 and motor 14 are connected in the electrical control system shown in Fig. 2.

For the space circuit, a pipe 117, operating as a supply to space heating elements 29, is connected to the lower portion of the casing 102 adjacent the tube sheet 104 and includes a flow control valve 118 of the gravity type. Water from the elements 29 is returned through a pipe 119 to the other coaxial branch of the T 99. Hence, when the pump 13 is circulating water through the space circuit, the flow is in the direction of the straight shafted arrows 120, i. e., downwardly through the pipe 98, upwardly through the boiler 97 and pipe 112, through a limited portion of the casing 102 to the pipe 117, the valve 118 being opened by pump pressure, through the space heating elements 29, and thence through the pipe 119 and T 99 to the other side of the pump 13, the valve 100 being then gravity closed.

The operation and control of the system shown in Fig. 4 is identical with those of Figs. 1 and 3, preferential control being vested in the service circuit. Also as in Fig. 3, the organization comprising the casing 102 and the parts carried thereby and included therein may be assembled at the factory and shipped for unit installation.

Another feature of the arrangements illustrated in Figs. 1, 3 and 4 is the trapping in the casings of the several instantaneous heaters of boiler water having a temperature sufficiently high to supply heat to the service water for a reasonable period while heat is being supplied to the space circuit, i. e., until the temperature of the service water drops below 140° F. In Fig. 1, a substantial portion of the casing 19 extends above the boiler 10 while in Figs. 3 and 4, the casings 85 and 102, respectively, are disposed wholly above the boilers 81 and 97, respectively, it being understood that, in Fig. 4, the coil 105 and the enclosing part of the casing 102 define an instantaneous heater 121. Since the casings 19, 85 and 102 would be fully covered by a coating of insulation (not shown) and heat cannot be supplied to the space circuit until the temperature of the service water attains 140° F., it is apparent that, when flow is shifted to the space circuit, there will be pocketed in the indicated casings boiler water having a temperature sufficient to produce the above service water temperature. Due to the insulation, loss of heat from the casings 19, 85 and 102 will proceed very slowly so that the service circuit is conditioned for a reasonable draw of service water during a period of heat supply to the space circuit and before flow is restored to the service circuit.

Instead of employing the temperature responsive control 34 for controlling the flow shift between the service and space circuits, a pressure responsive control, generally indicated by the numeral 122 in Fig. 5, may be utilized. The latter control includes an open ended fitting 123 that would be inserted in the pipe 26 in Fig. 1, or in the pipe 90 in Fig. 3, or in the pipe 111 in Fig. 4, close to the outlets of the respective service water heating coils in these figures and so that the service water would flow through a chamber 124 in the fitting.

The top wall of the fitting includes an opening 125 and bridged across this opening is a diaphragm 126 that is responsive to pressure changes in the chamber 124. The periphery of the diaphragm 126 is clamped against the fitting 123 by the flanged inner end of an inverted cup 127 and the outer end of the cup threadingly received an adjusting plug 128. Respectively abutting the top side of the diaphragm 126 and the inner end of the plug 128 are washers 129 and 130 and interposed between these washers is a helical loading spring 131 whose compression may be regulated by the plug 128 to determine an upward movement of the diaphragm at some selected pressure in the chamber 124 corresponding to the desired controlling temperature of the service water.

The lower end of a stem 132 is fast to the center of the diaphragm 126 and extends freely upward through the spring 131 and plug 128 for attachment to one end of a lever 133 that is preferably electrically non-conducting, being composed of a material such as a suitable plastic, and which is intermediately pivoted on a standard 134 carried by the cup 127. The other end of the lever 133 is provided with a contact 135 which coacts with a contact 136 carried by a base 137. Between the pivot of the lever 133 and the contact 135, the lever carries a second contact 138 which coacts with a contact 139 mounted on the base 137.

The contacts 135 and 136 are included in the electrical system for controlling the service circuit and therefore correspond to the contacts 42 and 44, respectively, in Fig. 2, while the contacts 138 and 139 are included in the electrical system for controlling the space circuit and hence correspond to the contacts 71 and 72, respectively, in Fig. 2. Accordingly, when the pressure responsive control 122 is substituted for the temperature responsive control 34 in Fig. 2, the wires 40 and 47 would be connected to the contacts 135 and 136, while the wires 70 and 74ª would be connected to the contacts 138 and 139, all respectively.

Since the spring 131 biases the contact 135 into engagement with the contact 136, separation of these contacts can only be accomplished by a pressure rise in the service water, which pressure at the interrupting point corresponds to a service water temperature of 140° F. and this interrupting pressure also engages the contacts 138 and 139. The control 127 is then conditioned to shift boiler water flow to the space circuit whenever the room thermostat 68 demands heat. If then one or more service outlets, such as a faucet, is opened, the accompanying drop in pressure in the chamber 124 will enable the spring 131 to reengage the contacts 135 and 136 and separate the contacts 138 and 139. However, if the contacts 135 and 136 are engaged when a faucet is opened, they remain in engagement because a draw of service water drops the pressure in the chamber 124.

In each of the above system modifications, the boiler is never required to simultaneously supply heat to the service and space circuits and hence the temperature of the boiler water can be raised more quickly to the desired figure than is possible in the usual system where the boiler must supply heat to both circuits at the same time.

I claim:

1. In a hot water heating system, the combination of a service water heating circuit, a space heating circuit, a boiler common to both circuits, passage means for service water in heat exchange relation to the service circuit, a reversible pump common to both circuits and responsive to the temperature of the service water for circulating boiler water in opposite directions below and above, respectively, a predetermined temperature of the service water, and valve means for directing the boiler water flow through the service circuit below said temperature and through the space circuit above said temperature.

2. In a hot water heating system, the combination of a service water heating circuit, a space heating circuit, a boiler common to both circuits, passage means for service water in heat exchange relation to the service circuit, a reversible pump common to both circuits and responsive to the temperature of the service water for circulating boiler water in opposite directions below and above, respectively, a predetermined temperature of the service water, and valve means biased to a closed position and arranged to simultaneously admit and deny boiler water to the service and space circuits, respectively, below said temperature and to simultaneously deny and admit boiler water to the service and space circuits, respectively, above said temperature.

3. In a hot water heating system, the combination of a service water heating circuit, a space heating circuit, a boiler common to both circuits, passage means for service water in heat exchange relation to the service circuit, a reversible pump common to both circuits and responsive to the temperature of the service water for circulating boiler water in opposite directions below and above, respectively, a predetermined temperature of the service water, and valve means responsive in an opening direction to pump pressure for directing boiler water flow through the service circuit below said temperature and through the space circuit above said temperature.

4. In a hot water heating system, the combination of a service water heating circuit, a space heating circuit, a boiler common to both circuits, passage means for service water in heat exchange relation to the service circuit, a reversible pump common to both circuits and responsive to the temperature of the service water for circulating boiler water in opposite directions below and above, respectively, a predetermined temperature of the service water, and valve means biased to a closed position and responsive in an opening direction to pump pressure and arranged to simultaneously admit and deny boiler water to the service and space circuits, respectively, below said temperature and to simultaneously deny and admit boiler water to the service and space circuits, respectively, above said temperature.

5. In a hot water heating system, the combination of a service water heating circuit, a space heating circuit, a boiler common to both circuits, passage means for service water in heat exchange relation to the service circuit, a reversible pump common to both circuits and responsive to the temperature of the service water for circulating boiler water in opposite directions below and above, respectively, a predetermined temperature of the service water, and first and second valves in the service and space circuits, respectively, each valve being gravity closed and opened by pump pressure when effective in the associated circuit, and the first and second valves being arranged to simultaneously admit and deny boiler water to the service and space circuits, respectively, below said temperature and to simultaneously deny and admit boiler water to the service and space circuits, respectively, above said temperature.

6. In a hot water heating system, the combination of a service water heating circuit, a space heating circuit, a boiler common to both circuits, passage means for service water in heat exchange relation to the service circuit, a reversible pump common to both circuits, thermostatic means responsive to the temperature of the service water and operable to effect actuation of the pump in opposite directions below and above, respectively, a predetermined temperature of the service water, and valve means for directing the boiler water flow through the service circuit below said temperature and through the space circuit above said temperature.

7. In a hot water heating system, the combination of a service water heating circuit, a space heating circuit, a boiler common to both circuits, passage means for service water in heat exchange relation to the service circuit, a reversible pump common to both circuits, means responsive to the pressure of the service water and operable to effect actuation of the pump in opposite directions below and above, respectively, a predetermined temperature of the service water, and valve means for directing the boiler water flow through the service circuit below said temperature and through the space circuit above said temperature.

8. In a hot water heating system, the combination of a service water heating circuit, a space heating circuit, a boiler common to both circuits, passage means for service water in heat exchange relation to the service circuit, a room thermostat positioned to be affected by the space circuit, temperature responsive means answering to the temperature of the service water, a reversible pump common to both circuits, a reversible motor drivably connected to the pump, electrical connections between the thermostat, temperature responsive means and motor arranged to circulate boiler water in opposite directions below and above, respectively, a predetermined temperature of the service water, and valve means for directing the boiling water flow through the service circuit below said temperature and through the space circuit above said temperature when the thermostat demands heat.

9. In a hot water heating system, the combination of a service water heating circuit, a space heating circuit, a boiler common to both circuits, passage means for service water in heat exchange relation to the service circuit, a room thermostat positioned to be affected by the space circuit, means responsive to the pressure of the service water, a reversible pump common to both circuits, a reversible motor drivably connected to the pump, electrical connections between the thermostat, pressure responsive means and motor arranged to circulate boiler water in opposite directions below and above, respectively, a predetermined temperature of the service water, and valve means for directing the boiler water flow through the service circuit below said temperature and through the space circuit above said temperature when the thermostat demands heat.

10. In a hot water heating system having a boiler and a service water heating circuit and a space heating circuit each communicating with the boiler, a reversible pump common to both circuits and responsive to the temperature of the service water for circulating boiler water in opposite directions below and above, respectively, a predetermined temperature of the service water, and valve means for directing the boiler water flow through the service circuit below said temperature and through the space circuit above said temperature.

11. In a hot water heating system having a boiler and a service water heating circuit and a space heating circuit each communicating with the boiler, a reversible pump common to both circuits and responsive to the temperature of the service water for circulating boiler water in opposite directions below and above, respectively, a predetermined temperature of the service water, and first and second valves in the service and space circuits, respectively, each valve being gravity closed and opened by pump pressure when effective in the associated circuit, and the first and second valves being arranged to simultaneously admit and deny boiler water to the service and space circuits, respectively, below said temperature, and to simultaneously deny and admit boiler water to the service and space circuits, respectively, above said temperature.

12. In a hot water heating system, the combination of a boiler, a service water heating circuit including a casing positioned above the boiler, a space heating circuit, the boiler being common to both circuits and the connections of the casing to the system being disposed below the upper portion of the casing whereby air is trapped in the casing when the system is filled to accommodate expansion in the system, passage means for service water in heat exchange relation to the boiler water in the casing, a reversible pump common to both circuits and responsive to the temperature of the service water for circulating boiler water in opposite directions below and above, respectively, a predetermined temperature of the service water, and valve means directing the boiler water flow through the service circuit below said temperature and through the space circuit above said temperature.

ROBERT E. MOORE.

No references cited.